United States Patent [19]
Neri et al.

[11] Patent Number: 5,015,819
[45] Date of Patent: May 14, 1991

[54] DEVICE FOR PERFORATING ROD-SHAPED ITEMS

[75] Inventors: Armando Neri, Bologna; Mario Turra, Casalecchio Di Reno, both of Italy

[73] Assignee: G.D. Societa' Per Azioni, Italy

[21] Appl. No.: 373,326

[22] Filed: Jun. 28, 1989

[30] Foreign Application Priority Data

Jun. 29, 1988 [IT] Italy ................................ 3526 A/88

[51] Int. Cl.⁵ ............................................. B23K 26/00
[52] U.S. Cl. ................................ 219/121.7; 131/281
[58] Field of Search ............. 219/121.7, 121.71, 121.6, 219/121.85; 131/281

[56] References Cited

U.S. PATENT DOCUMENTS 4,565,202 1/1986 Seraqnoli et al. ............ 219/121.7 X

FOREIGN PATENT DOCUMENTS 0292666 11/1988 European Pat. Off. ............ 131/281
2119223 11/1983 United Kingdom ................ 131/281
2155753 10/1985 United Kingdom ................ 131/281

Primary Examiner—C. L. Albritton
Attorney, Agent, or Firm—Gifford, Groh, Sprinkle, Patmore and Anderson

[57] ABSTRACT

A device for forming perforations in rod shaped items, particularly cigaretts, comprising a transfer roller for transferring the items from a loading position to an unloading position on the periphery of the roller, the items being arranged parallel to the axis of the roller and housed in rotary bodies on the same; rotary means coaxial with the roller and designed to emit a radial coherent light (laser) beam on to a portion of the items; and an electronic control circuit for regulating the speed of the rotary means in relation to that of the transfer roller and so regulate the number of perforations formed in the aforementioned portions of the items.

14 Claims, 3 Drawing Sheets

DEVICE FOR PERFORATING ROD-SHAPED ITEMS

BACKGROUND OF THE INVENTION

The present invention relates to a device for perforating rod-shaped items.

In particular, the present invention relates to a perfected device of the aforementioned type, which may be used to particular advantage for the manufacture of cigarettes or similar, to which the following description refers purely by way of example.

In the cigarette manufacturing industry, so-called ventilated cigarettes are known to be produced featuring a number of holes in the filter for enabling a certain amount of air to be inhaled along with the smoke, and so rendering the same less harmful by reducing its strength and temperature.

Said ventilation holes are known to be formed using perforating devices comprising a coherent light (laser) source.

One such device is described in U.S. Pat. No. 4,647,752 filed by the present Applicant and the content of which is included herein purely by way of reference as required. This comprises a cigarette transfer roller designed to turn about its axis and having peripheral seats parallel to the same. The cigarettes are fed by a supply roller into said seats, which also turn about their respective axes at constant speed, and, at the end of a so-called perforating arc, are unloaded on to a pick-up roller. A laser beam generating unit directs a laser beam, coaxial with the transfer roller, on to a reflecting element consisting of a mirror turning faster than the transfer roller and driven by the same means. As the mirror turns, therefore, a reflected laser beam successively strikes a number of focusing lenses assigned to each seat, so as to form a perforation in each cigarette at each pass.

The number of perforations formed in each cigarette therefore equals the number of complete turns made by the reflecting mirror in the time taken for each cigarette to travel over said perforating arc. Said perforations are equally spaced about the circumference of each cigarette, or arranged in the form of a spiral, if said seats are turned repeatedly and moved axially at the same time.

Any change in the amount of ventilation provided for is made by varying the number of holes formed by the perforating device.

In the case of the aforementioned known device, this is achieved using devices for deflecting, intercepting or cutting off the laser beam, and so varying the number of perforations in relation to the number of turns of the reflecting mirror as each cigarette travels over said perforating arc.

Known regulating systems of the aforementioned type present a number of drawbacks. In addition to having to provide the perforating device with said laser beam deflecting, intercepting and cut-off means, these require a good deal of painstaking work on the part of the operator, thus resulting in production holdups and impaired flexibility. Also, due to operation of said systems consisting in intercepting or cutting off the laser beam in given perforating positions, the resulting perforations on the cigarettes are not equally spaced.

SUMMARY OF THE INVENTION

The aim of the present invention is to provide a laser beam perforating device designed to overcome the afore-mentioned drawbacks typically associated with known devices, i.e. a device enabling the number of perforations to be varied with no need for laser beam deflecting, intercepting or cut-off means.

With this aim in view, according to the present invention, there is provided a device for forming perforations in rod-shaped items, said device comprising a transfer roller for transferring said items from a loading position to an unloading position on the periphery of said roller, said items being arranged parallel to the axis of said roller and housed inside rotary bodies on the same; and rotary means coaxial with said roller and designed to emit a coherent light (laser) beam radially in relation to said roller and on to a portion of said items; characterized by the fact that it comprises an electronic control circuit for regulating the speed of said rotary means in relation to that of said roller, and so regulate the number of perforations formed in said portion of said items.

BRIEF DESCRIPTION OF THE DRAWINGS

A preferred non-limiting embodiment of the invention will be described by way of example with reference to the accompanying drawings, in which.

DETAILED DESCRIPTION OF THE INVENTION

Figure 1:
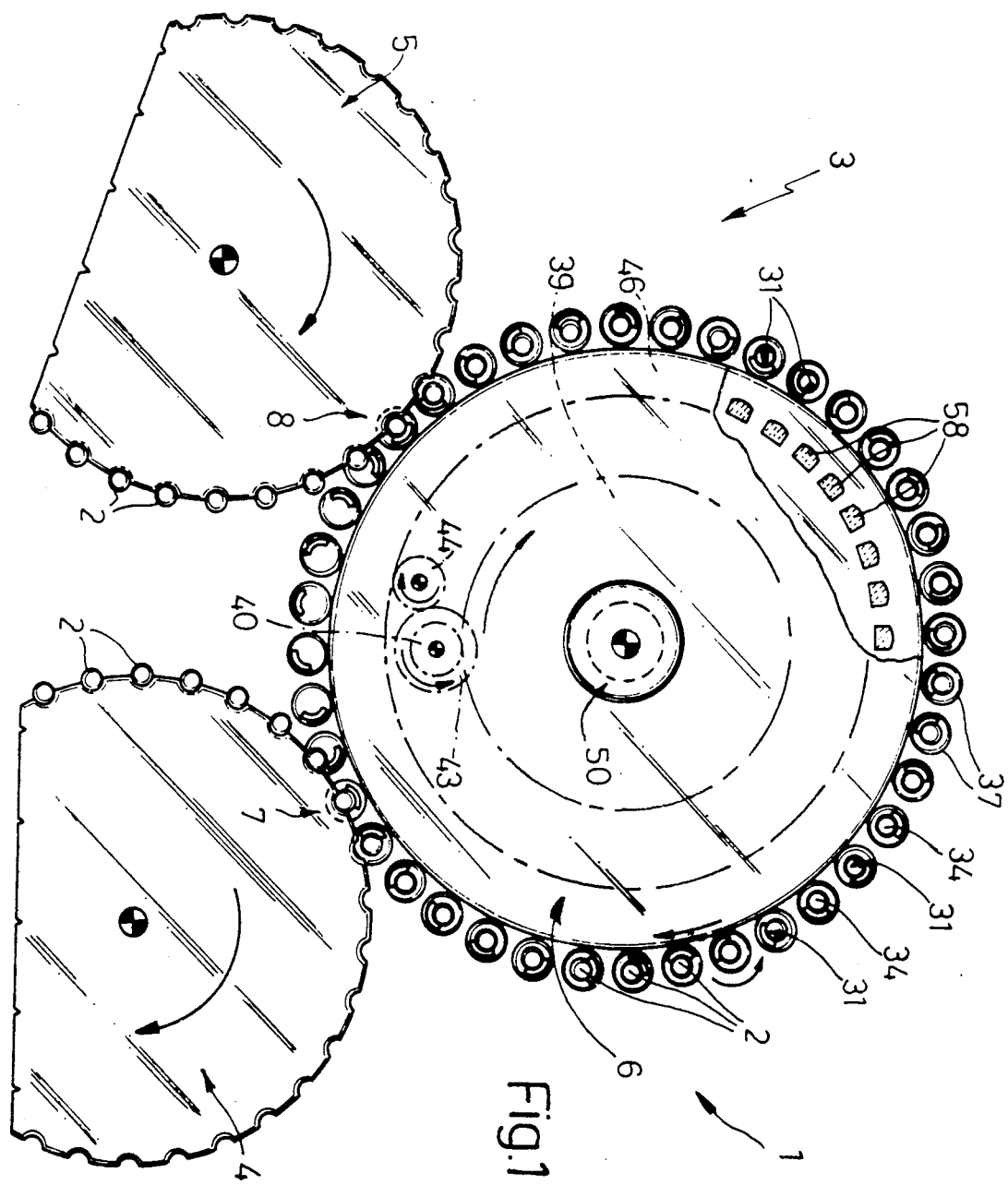
FIG. 1 shows a schematic front view of a perforating device in accordance with the teachings of the present invention.

Number 1 in FIG. 1 indicates a perforating device for perforating rod-shaped items or cigarettes 2 and forming part of a filter assembly machine indicated as a whole by 3.

Figure 2:
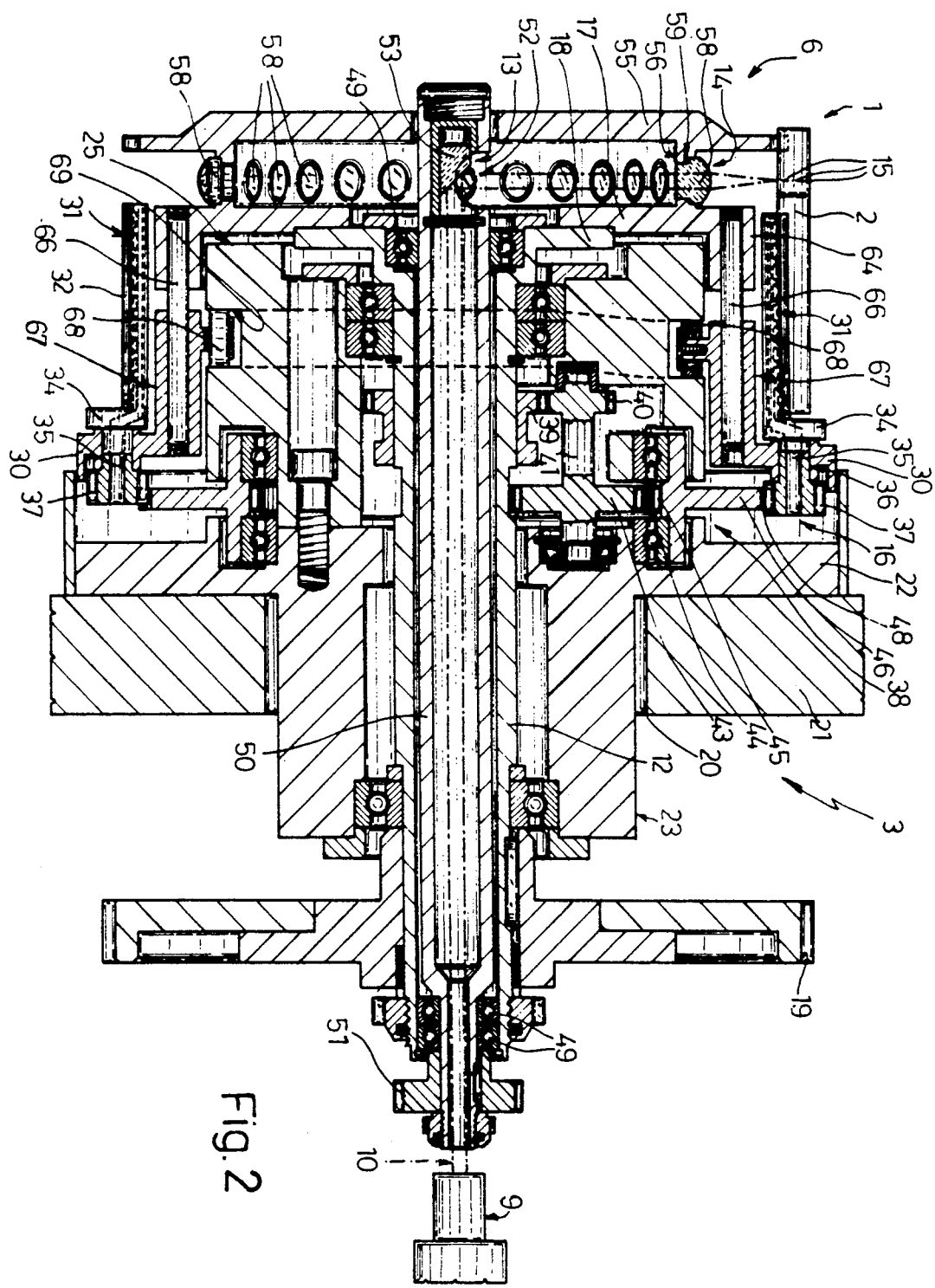
FIG. 2 shows a partially-sectioned side view of the FIG. 1 device.

Perforating device 1 comprises an input roller 4 and output roller 5 turning in the same direction, and an intermediate roller 6 located between and tangent to rollers 4 and 5 at points 7 and 8. Said points of tangency 7 and 8 define, on the periphery of roller 6, two conjugate arcs, a first extending between points 7 and 8 in the rotation direction of roller 6 and hereinafter referred to as the "perforating arc", and a second hereinafter referred to as the "return arc". As shown in FIGS. 1 and 2, perforating device 1 also comprises a coherent light (laser) beam generating unit 9 designed to emit a laser beam 10 along the axis of a central tubular shaft 12 on roller 6; a reflecting device 13 for deflecting beam 10 substantially radially; a focusing device 14 turning with roller 6 and designed to successively focus beam 10 on to cigarettes 2 for forming a ring of perforations 15 on the same; and a rotating device 16 designed to turn cigarettes 2 at a given constant speed about their respective axes, as they are moved forward by roller 6 turning about the axis of shaft 12.

Figure 3:
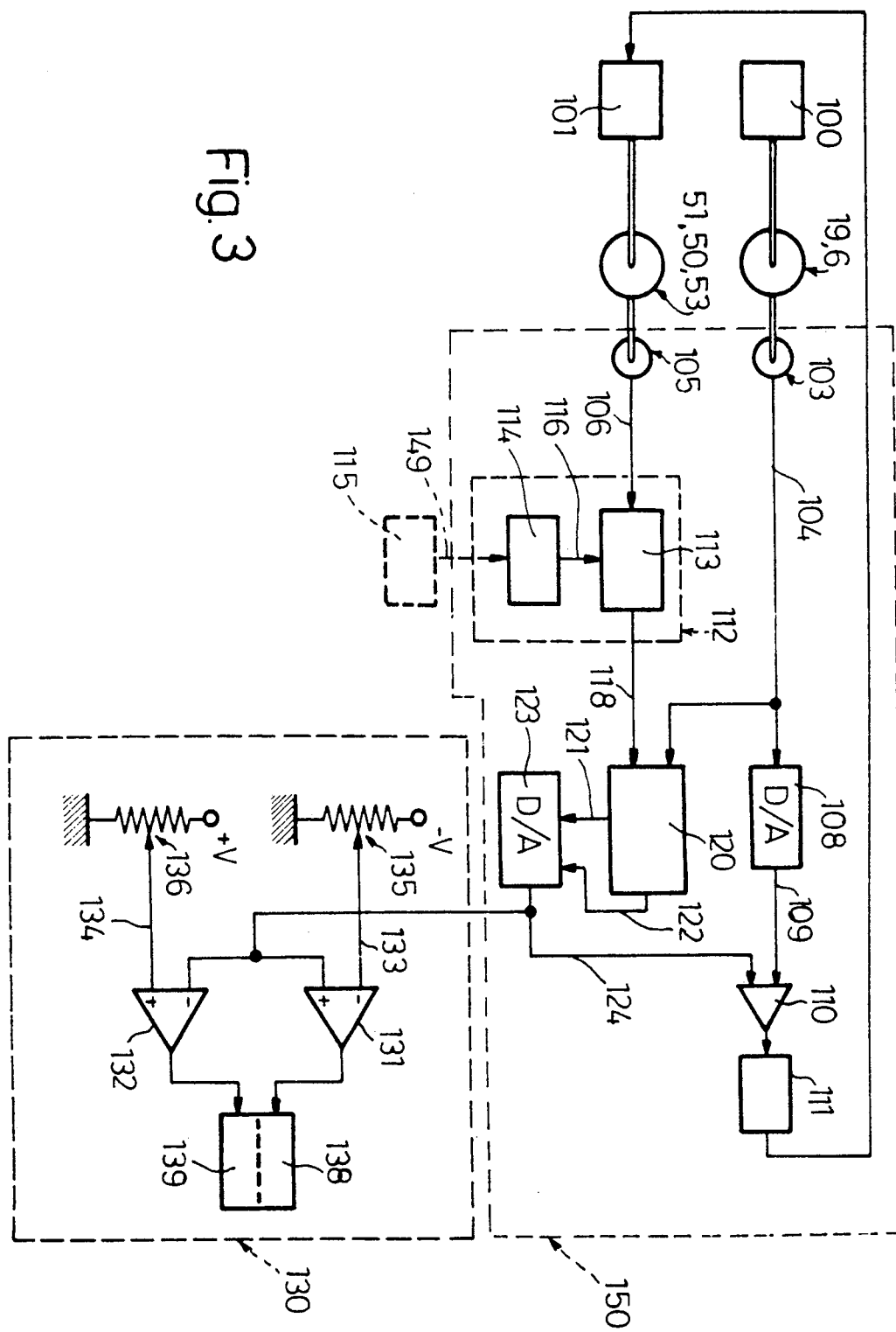
FIG. 3 shows a block diagram of a control and regulating circuit forming part of the device according to the present invention.

As shown in FIG. 2, roller 6 is secured angularly by inner flange 17 to an annular end flange 18 on tubular shaft 12. This extends through roller 6 and, on the opposite end to that connected to roller 6, supports a gear 19 connected (in a manner not shown) to a main electric motor 100 (FIG. 3).

An intermediate portion of shaft 12 extends through a hole 20 in a fixed wall 21 of filter assembly machine 3, the outer surface of which is fitted integral with a flange 22 of a tubular body 23 coaxial with shaft 12 and extending through hole 20. The outer surface of flange 22 is fitted integral with a further tubular body 25 which, together with coaxial tubular body 23, supports shaft 12 in rotary manner.

Rotating device 16 comprises a number of cradles 31 equally spaced about the outer lateral surface of roller 6 and each having a seat 32 for a respective cigarette 2 which is retained inside the same by suction through respective ducts connected to a suction device (not shown). Said cradles 31 extend parallel to the axis of roller 6, and each present a head 34 from which extends an axial pin 35 mounted for rotation through a respective hole 36 formed through an outer annular portion 30 of respective slides 67 arranged about the lateral surface of roller 6 and described in more detail later on. The end of each pin 35 is fitted with end gear 37 of a set of gears 38, the other end gear 39 of which is fitted to shaft 12. Said set of gears 38 comprises a first gear 40 meshing with gear 39 and fitted to shaft 41. This is also fitted with a second gear 43 which, via an intermediate gear 44, is connected to the internal teeth 45 of a cylindrical ring gear 46 coaxial with shaft 12 and supported on tubular bodies 23 and 25.

Ring gear 46 presents external teeth 48 connected to gears 37 of all of pins 35.

A tubular shaft 50 is fitted for rotation through shaft 12 via the interposition of bearings 49. A first end of shaft 50 projects from shaft 12 on the gear 19 side and is fitted with a gear 51 connected (in a manner not shown) to an electric motor 101, the speed of which, according to the present invention, is continuously adjustable as described later on in connection with FIG. 3. The other end of tubular shaft 50 projects from shaft 12 at the front of roller 6, and presents an elongated axial slot 52 inside the front wall 55 of roller 6. Beam 10 travels through shaft 50 and is deflected outside shaft 50 and through slot 52 by reflecting device 13. This comprises an inclined mirror or reflecting element 53 located inside shaft 50 along the path of beam 10, and designed to deflect beam 10 substantially radially on to the periphery of roller 6.

Front wall 55 of roller 6 is connected to inner flange 17 via a tubular portion 56 which also supports focusing device 14. This comprises a ring of focusing lenses 58, each housed inside a respective radial through hole 59 formed in tubular element 56 facing the end portion of a respective cigarette 2 to be perforated. Cigarette 2 projects from respective cradle 31 and, in use, is arranged with the portion to be perforated facing respective lens 58 between flange 17 and front wall 55. The outer edge of flange 17 forms an outer ring 64 into which is fitted, at each cradle 31, the respective end of a guide rod 66 of a slide 67 travelling between ring 64 and gear 46 and supporting respective pin 35 in rotary manner.

Gear 37 on each pin 35 engages in sliding manner with teeth 48 of gear 46, and is of such a length as to mesh at all times with teeth 48 regardless of the axial position of slide 67. The inner surface of each slide 67 is fitted with a radial cam follower 68 engaging a groove 69 formed on the outer surface of body 25. With reference to the block diagram in FIG. 3, electric motor 100 (AC or DC) turns transfer roller 6 via gear 19. Roller 6 is connected to an encoder 103, i.e. a known device designed to supply an output signal 104 consisting of a series of pulses, the frequency and phase of which respectively indicate the speed and position of roller 6. Electric motor 101 (speed-adjustable, with a relatively high static torque for enabling rapid speed control response) is conveniently a DC or brushless type, for turning shaft 50 via gear 51. Shaft 50 supports reflecting mirror 53, to which is connected an encoder 105 for supplying an output signal 106 consisting of a series of pulses, the frequency and phase of which respectively indicate the speed and position of shaft 50.

Digital signal 104 is sent to a digital-analog converter block 108, which supplies an output signal 109 for controlling a first input of an adding block 110, in turn controlling a known block 111 controlling the speed of motor 101.

Digital signal 106 is sent to a dividing circuit 112 comprising a preselection counter 113 controlled by a digital signal 116 constituting the divisor and supplied by preselector block 114, which may comprise selector circuits, e.g. rotary switches, set directly by the operator. Preselection counter 113 therefore recieves digital signal 106, and supplies a digital output signal 118, the frequency of which equals a fraction of the signal 106 frequency, depending on the value of signal 116.

Digital signals 118 and 104 are sent to the two inputs of a reversible counter block 120, which supplies a first digital signal 121 indicating the phase difference of input signals 118 and 104, and a second signal 122 indicating the phase difference sign. Said signals 121 and 122 are sent to a digital-analog converter block 123, which supplies an analog output signal 124 respresenting said phase difference and which is sent to the other input of adding block 110 as a correcting signal for regulating the speed of motor 101 as described in more detail later on.

Analog signal 124 is also sent to an alarm circuit 130, in particular, to the positive input of a first differential amplifier 131, and to the negative input of a second differential amplifier 132, the other two inputs of which are supplied with respective signals 133 and 134 from potentiometers 135 and 136 supplied with negative and positive voltage respectively. The outputs of said amplifiers 131 and 132 are sent to the inputs of respective alarm blocks 138 and 139 consisting of acoustic and/or optical indicators.

In actual use, and under normal operating conditions of the perforating device, cigarettes 2 are transferred by roller 6, turned at substantially constant speed by motor 100, from loading position 7 to unloading position 8. During such transfer, cradles 31 housing ciagrettes 2 are turned continuously about their respective axes by motor 100, via the kinematic chain consisting of shaft 12 and gear set 38 as far as gears 37, and are also moved axially via respective slides 67. Cirgarettes 2 are thus perforated all around by laser beam 10 focused by lenses 58, subsequent to being deflected radially by reflecting mirror 53, which is also turned by shaft 50 driven by motor 101.

The number of perforations 15 formed in each cigarette 2 as it travels over the perforating arc is equal to the number of complete turns made by reflecting mirror 53 within the same time. Said number is supplied in the form of signal 116 by block 114 as a function of the selected setting, and also represents the speed ratio of motors 101 and 100.

Under normal operating conditions, signals 118 and 104 are always phased so that correction signal 124 is nil, and the constant operating speed ratio of motors 101 and 100 is as determined by signal 116 representing the number of perforations 15 formed in each cigarette 2.

Any change in the speed ratio of motors 100 and 101, during operation of the device according to the present invention, brings about a change in signal 106 and, consequently also, signal 118. This produces a phase difference between signals 104 and 118, accompanied by a proportional value of correction signal 124 which, via block 110 and circuit 111, accordingly corrects the speed of motor 101 to eliminate the variation in the set speed ratio. Should the speed of motor 101 fall, for example, signal 118 is delayed in relation to signal 104, thus producing a proportional positive value of correction signal 124 which, via blocks 110 and 111, increase the speed of motor 101 until the set operating value is restored. Similarly, should the speed of motor 101 increase, signal 118 is anticipated in relation to signal 104, thus producing a proportional negative value of correction signal 124 which, via blocks 110 and 111, reduces the speed of motor 101 until the set operating value is restored.

If the variation in the speed of motor 101 in relation to the set speed remains within a given range, as determined by the settings of potentiometers 135 and 136 of alarm circuit 130, the outputs of amplifiers 131 and 132 remain high and alarm blocks 138 and 139 are not activated. If the variation in speed exceeds said range, however, thus producing a proportionally high value of signal 124, a "0" alarm signal is produced for block 138, if the speed of motor 101 falls below the minimum defined by signal 133, or for block 139, if the speed of motor 101 exceeds the maximum defined by signal 134.

According to the present invention, the number of perforations 15 formed in each cigarette 2 may be adjusted by simply regulating signal 116, which is done by the operator simply setting the required number of perforations on preselector block 114 (corresponding, that is, to the speed ratio of shaft 50 and roller 6). This dephases signals 118 in relation to signal 104 to produce a correction signal 124 which, as already stated, adjusts the speed of motor 101 via blocks 110 and 111 so as to eliminate the phase difference. In the case in question, motor 101 is set to such a speed as to eliminate the phase difference as a function of the speed ratio of motors 100 and 101 set via block 114. For increasing the number of perforations in cigarettes 2, for example, the increased value set on block 114 produces a negative phase difference between signals 118 and 104, and a proportionally positive signal 124, which increases the speed of motor 101 until the ratio of this and motor 100 is as selected via block 114. An increase in the number of turns of reflecting mirror 53 is therefore accompanied by a corresponding increase in the number of times the laser beam is reflected on to the perforating arc, thus increasing the number of perforations 15 formed in each cigarette 2. The opposite procedure applies for reducing the number of perforations 15.

The advantages of the present invention will be clear from the foregoing description. In particular, by virtue of eliminating the rigid gearing between reflecting mirror 53 and the means powering transfer roller 6, the device according to the present invention provides for adjusting the number of perforations by adjusting rotation of mirror 53 in relation to roller 6. Moreover, this is achieved by means of a straightforward electronic setting and control circuit 150, thus enabling a high degree of flexibility and the elimination of cumbersome, additional devices for deflecting or intercepting the laser beam. What is more, the resulting perforations 15 are always equally spaced.

To those skilled in the art it will be clear that changes may be made to the embodiment described and illustrated herein without, however, departing from the scope of the present invention.

For example, instead of being set manually by the operator via block 114, signal 116 indicating the number of perforations 15 may be determined automatically by a block 115 representing a known type of ventilation test unit for testing cigarettes 2 downstream from roller 6. In particular, said test unit provides for suction testing the perforated cigarette 2, to determine the value of a parameter depending on the number of perforations 15, and, as a function of the difference between this and a given reference parameter, produces a signal 149 indicating the number of perforations 15 to be formed in cigarette 2. Said signal 149 is sent to block 114, which controls counter block 113 via digital divisor signal 116 as already described.

What is claimed is:

1. A device for forming perforations in rod-shaped items (2), said device comprising a transfer roller (6) for transferring said items (2) from a loading position (7) to an unloading position (8) on the periphery of said roller (6), said items (2) being arranged parallel to the axis of said roller (6) and housed inside rotary bodies (31) on the same; and rotary means (53) coaxial with said roller (6) and designed to emit a coherent light (laser) beam (10) radially in relation to said roller (6) and on to a portion of said items (2); characterized by the fact that it comprises an electronic control circuit (150) for regulating the speed of said rotary means (53) in relation to that of said roller (6), and so regulate the number of perforations (15) formed in said portion of said items (2).

2. A device as claimed in claim 1, characterized by the fact that it comprises first motor means (100) and second motor means (101) for respectively controlling rotation of said roller (6) and said coaxial means (53); said electronic control circuit (150) comprising means (110, 111, 108, 123, 105) for enabling loop control of the speed of said second motor means (101) in relation to that of said first motor means (100) as a function of a selectable reference value (116).

3. A device as claimed in claim 2, characterized by the fact that said reference value (116) is supplied by a manually set preselector block (114).

4. A device as claimed in claim 2, characterized by the fact that said reference value (116) is determined by automatic means (115) designed to test at least one of said perforated items (2) downstream from said transfer roller (6), and generate a signal (149) for obtaining said reference value (116) as a function of the difference between the values of said test parameter and a given predetermined reference parameter.

5. A device as claimed in claim 4, characterized by the fact that said automatic means (115) provide for suction testing said item (2).

6. A device as claimed in claim 2, characterized by the fact that said reference value (116) represents the number of perforations (15) formed in said portion of said items (2).

7. A device as claimed in claim 2, characterized by the fact that said reference value (116) is sent to a first block (112) for modifying a first signal (106) depending on the speed of said second motor means (101); the output signal (118) of said first block (112) and a second signal (104) depending on the speed of said first motor means (100) being sent to a comparing block (120) supplying an output signal (124) for correcting the speed of said second motor means (101).

8. A device as claimed in claim 7, characterized by the fact that said first block (112) comprises a divider block.

9. A device as claimed in claim 7, characterized by the fact that said first block (112) comprises a preselection counter (113).

10. A device as claimed in claim 7, characterized by the fact that said comparing block (120) comprises a reversible counter, the two inputs of which are supplied respectively with the output signal (118) of said first block (112) and said second signal (104), and which supplies said correction signal (124) via a digital-analog converter block (123).

11. A device as claimed in claim 7, characterized by the fact that, together with a control signal (109) depending on the speed of said first motor means (100), said correction signal (124) is sent to the input of means (110, 111) for controlling the speed of said second motor means (101).

12. A device as claimed in claim 11, characterized by the fact that said control means comprise an adding circuit (110) for adding said input signals (109, 124), and a circuit (111) for controlling the speed of said second motor means (101).

13. A device as claimed in claim 7, characterized by the fact that said correction signal (124) is sent to an alarm circuit (130) comprising means (131, 132) for determining whether the value of said correction signal (124) falls within a given range, and, if not, for activating alarm means (138, 139).

14. A device as claimed in claim 1, characterized by the fact that said items consist of cigarettes (2).

* * * * *